Figure 1:
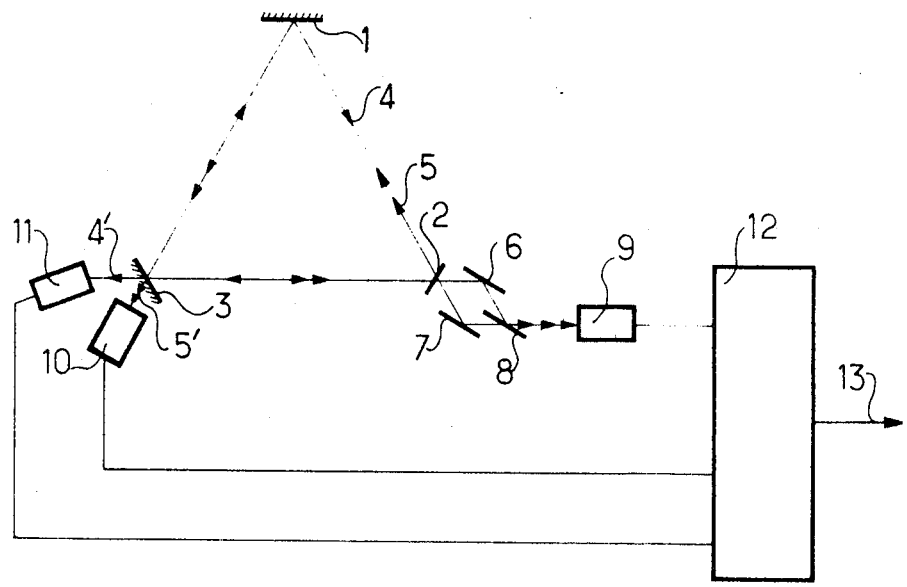

United States Patent

[11] 3,597,088

[72] Inventor Jean-Michel Catherin
Savigny-sur-Orge, France
[21] Appl. No. 822,262
[22] Filed May 6, 1969
[45] Patented Aug. 3, 1971
[73] Assignee Compagnie Generale D'Electricite
Paris, France
[32] Priority May 6, 1968
[33] France
[31] PV 150,745

[54] LASER GYROMETER
5 Claims, 2 Drawing Figs.
[52] U.S. Cl. .................................................. 356/106
[51] Int. Cl. ............................................... G01b 9/02
[50] Field of Search ........................................ 356/106 RL

[56] References Cited
OTHER REFERENCES

5- B1 Measurement of Saturation Induced Optical Non-Reciprocity in a Ring Laser Plasma, P. H. Lee & J. G. Atwood

*Primary Examiner*—Ronald L. Wibert
*Assistant Examiner*—Conrad Clark
*Attorney*—Craig, Antonelli, Stewart and Hill

ABSTRACT: A laser gyrometer which is characterized in that it comprises means for detecting the power of each of the propagating waves, means for detecting the beat frequency of said propagating waves, and an electronic circuit introducing corrections with respect to the signal supplied by said means for detecting the beat frequency from the data furnished by said means for detecting the power of each of the waves.

PATENTED AUG 3 1971

3,597,088

LASER GYROMETER

The present invention relates in general to ring lasers, and more particularly to such lasers when used to form a gyrometer.

It is known that a ring laser furnishes at the output thereof two propagating waves $f_1$ and $f_2$ which circulate in opposite directions. When the gyrometer is driven with a rotating movement, the two propagating waves do not have the same frequency since the speed of rotation is added to one wave and subtracted from the other wave. A detector having quadratic detection connected to the output of the ring laser detects the frequency difference between the two propagating waves and furnishes at its output a signal whose frequency is equal to the difference $f_1-f_2$.

It is found that in a first approximation, $f_1-f_2=K\omega\omega$ being the component in the plane of the gyrometer of the angular speed of rotation of the latter, and $K$ being a constant which is called the scale factor. Further calculation shows that in reality the term K is not strictly constant and that the correct value of $\omega$ cannot be obtained without taking into account the value of the amplitude of the propagating waves and also other parameters of the laser gyrometer. In order to obtain a constant value of the factor K, a first solution consists in stabilizing the laser. This solution, however, has the disadvantage of requiring complicated and onerous devices whose operation is not completely satisfactory at the present state of the art.

For this reason it is the object of the present invention to propose a device which takes into account intensity variations of the propagating waves of the ring laser without resorting to the use of special stabilizing devices.

More particularly, the present invention is directed to and concerned with a laser gyrometer which is characterized in that it comprises means for detecting the power of each of the propagating waves, means for detecting the beat frequency of these propagating waves, and an electronic circuit introducing corrections with respect to the signal supplied by these means for detecting the beat frequency from the data furnished by the means for detecting the power of each of the waves.

Figure 2:
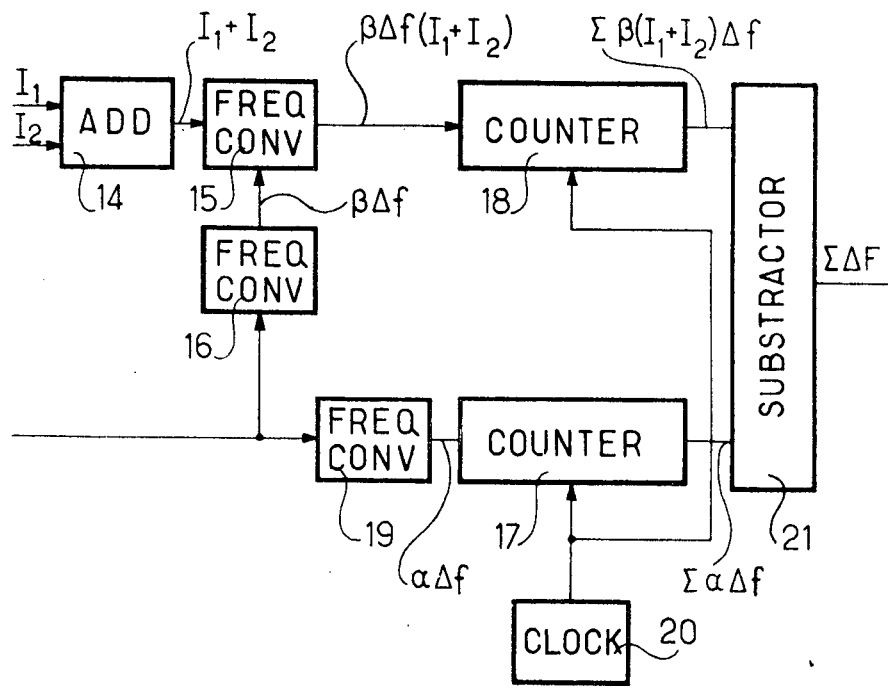

These and other objects, features and advantages of the invention will become apparent from the following detailed description thereof when taken in conjunction with the accompanying drawings, wherein:

FIG. 1 is a schematic diagram of a ring laser arrangement in accordance with the present invention, and FIG. 2 is a block diagram of the electronic circuit of FIG. 1.

In FIG. 1, a ring laser is represented by its mirrors 1, 2 and 3 defining an optical path through which passes a propagating wave 4 and a further propagating wave 5 circulating in opposite directions. The mirror 3 has a transmitting power not quite zero and therefore, it allows a fraction 4' and 5' of the waves 4 and 5 to pass. These fractions 4' and 5' are received by detectors 11 and 10, respectively, and the detectors each supply at the output thereof a signal proportional to the power $I_1$ and $I_2$ of the waves 4 and 5, respectively.

The ring laser comprises on the other hand a set of mirrors 6, 7 and 8 which are associated with the mirror 2 and whose transmitting powers are such that a detector 9 receives the beat signal produced by the waves 4 and 5. The detector 9 furnishes at the output thereof a signal whose frequency is equal to the frequency $f_1-f_2$ of the beat signal which has been detected.

According to the present invention, the outputs of the detectors 11, 10 and 9 are connected with respective inputs of an electronic circuit 12 which is capable of supplying at the output 13 thereof a signal having a frequency equal to $$\Delta F = (f_1-f_2)\left[1-A\left(B+C\frac{I_1+I_2}{2}\right)\right]+AD(I_1-I_2)$$

wherein the terms $A$, $B$, $C$ and $D$ are constants. According to the present invention, a suitable choice of these constants produces a value $\Delta F$. making it possible to define with great precision the value $\omega$ of the speed of rotation of the laser by applying the formula $\Delta F=K'\omega$, $K'$ being a well defined constant.

The practical realization of the electronic circuit 12 does not pose any particular technical problem and may be effected by a judicious combination of known logical elements, as will be seen in connection with FIG. 2, and the value of the constants is obtained experimentally in the well known manner by imparting to the laser rotations having a known angular speed and solving for the constants using measured values of power.

In fact, it has been found that the term $AD(I_1-I_2)$ could be disregarded and that it was sufficient to intervene with respect to the frequency $\Delta f$ delivered at the output of the ring laser by taking into account solely the coefficient of the sum of the powers $I_1+I_2$ of the two propagating waves of the laser.

The correction formula would then be:

$$\Delta F = \Delta f\left[1-A\left(B+C\frac{I_1+I_2}{2}\right)\right]$$

$$\Delta F = \Delta f - AB\Delta f - AC\Delta f\left(\frac{I_1+I_2}{2}\right)$$

and $$\Delta F = (1-AB)\Delta f - AC\Delta f\left(\frac{I_1+I_2}{2}\right)$$

When one places $(1-AB)=\alpha$ and $AC/2=\beta$, one obtains $\Delta F= \alpha\Delta f-\beta\Delta f(I_1+I_2)$ FIG. 2 shows a block diagram of an electronic device which effects the necessary correction of the beat frequency $\Delta f$ delivered by the ring laser in accordance with the above-mentioned formula.

The two outputs of the detectors 10 and 11 (FIG. 1) are connected to the two inputs of a voltage adding device 14 which may furnish at the output thereof a signal proportional to $I_1+I_2$. The output of the adding device 14 is connected to an input of the controllable frequency converter 15.

The output of the photosensitive detector 9 (FIG. 1) which supplies a signal having the beat frequency $\Delta f$ is connected on the one hand to the input of a first frequency converter 16 which is adapted to bring about the change of frequency $\Delta f$ into $\beta\Delta f$ wherein $\beta$ is a previously indicated parameter and, on the other hand, to a second frequency converter 19 which is adapted to bring about the change of frequency $\Delta f$ into $\alpha\Delta f$, wherein $\alpha$ is also the previously indicated parameter.

The output of the second frequency converter 19 is connected to the input of a first counter 17 which is adapted to carry out the counting of the beat frequencies $\Delta f$ during a specific period of time. The output of the frequency converter 16 is connected to a second input of the controllable frequency converter 15. The output of the frequency converter 15 which delivers the signal $\beta\cdot(I_1+I_2)\Delta f$ is connected to a second counter 18 which is adapted to count during a specific period of time the number of beat frequencies delivered by the frequency converter 15.

The beginning and end of the counting of the beat frequencies $\beta(I_1+I_2)\cdot\Delta f$ by the counter 18 and $\alpha\Delta f$ by the counter 17 may be controlled by a device 20 which defines a time basis, such as, for example, a clock which delivers pulses at specific instants and whose output is connected respectively to the control inputs of the counters 17 and 18.

The output of these two counters is then connected to two inputs of a subtractor 21 which produces the difference $\alpha\Delta f -\beta\Delta f(I_1+I_2)$ and furnishes at its output the $\Delta f$ frequency signal corrected over a specific period of time.

It is understood that the present invention is by no means limited to the embodiment described and shown herein, which has been given only by way of example. More particularly, modifications concerning detail may be applied thereto; certain provisions may be changed therein, or certain specific means may be exchanged for equivalent means without departing from the spirit and scope of the present invention.

I claim:

1. A laser gyrometer comprising:
    a ring laser combination including a closed polygonal optical path, a laser propagating first and second waves in opposite directions along said optical path and first detection means for detecting the beat frequency between said first and second waves circulating in said optical path, second detection means for detecting the power of each of said first and second propagating waves, and control means responsive to the output of said second detection means for introducing correction to the signal delivered by said first means, said control means providing an output in the form of:

$$\Delta F = \Delta f\left[1 - A\left(B + C\frac{I_1 + I_2}{2}\right)\right]$$

wherein $\Delta f$ is the output of said control means, $A$, $B$, and $C$ are constants, $\Delta f$ is the output of said first detection means, and $I_1$ and $I_2$ are the powers of said first and second waves, respectively derived from said second detection means.

2. A laser gyrometer as defined in claim 1 wherein said second detector means includes first and second detectors coupled to said optical path for detecting the power of said first and second waves, respectively.

3. A laser gyrometer as defined in claim 2 wherein said control means includes an adder connected to the outputs of said first and second detectors for producing the signal $I_1+I_2$, a first frequency converter connected to the output of said first detection means for producing the signal $AC/2\ \Delta f$ and a second frequency converter connected to the output of said adder and said first frequency converter for producing the signal $AC/2\Delta fay(I_1+I_2)$.

4. A laser gyrometer as defined in claim 3 wherein said control means further includes a third frequency converter connected to the output of said first detection means for producing the signal $(1-AB)\Delta f$.

5. A laser gyrometer as defined in claim 4 wherein said control means further includes first and second counters connected to the outputs of said second and third frequency converters, respectively, a clock source applying clock signals to said first and second counters, and a subtractor for subtracting the outputs of said first and second counters.